United States Patent
Lee

(10) Patent No.: US 6,734,996 B1
(45) Date of Patent: May 11, 2004

(54) SCANNING APPARATUS CAPABLE OF AUTOMATICALLY POWERING ON

(75) Inventor: Paul Lee, Shindian (TW)

(73) Assignee: Lite-On Technology Corporation, Taipei (TW)

( * ) Notice: Subject to any disclaimer, the term of this patent is extended or adjusted under 35 U.S.C. 154(b) by 679 days.

(21) Appl. No.: 09/669,881

(22) Filed: Sep. 27, 2000

(51) Int. Cl.$^7$ ................................................ H04N 1/04
(52) U.S. Cl. ........................ 358/486; 358/497; 358/474; 358/488; 358/483; 399/379; 399/380
(58) Field of Search ................................. 358/406, 504, 358/488, 486, 497, 474, 494, 483, 482; 399/379, 380, 211; 355/75, 40, 54; 250/208.1, 234–236; 382/312, 318, 319

(56) References Cited

U.S. PATENT DOCUMENTS 5,900,950 A * 5/1999 Hsu ............................ 358/497
6,163,388 A * 12/2000 Lee et al. .................... 358/488
6,512,602 B1 * 1/2003 Sheng et al. ................. 358/498
6,594,039 B1 * 7/2003 Kanbayashi ................. 358/497

* cited by examiner

Primary Examiner—Cheukfan Lee
(74) Attorney, Agent, or Firm—Rabin & Berdo, P.C.

(57) ABSTRACT

A scanning apparatus capable of automatically powering on is disclosed. The scanning apparatus includes a main body, a lid, a carriage inside the main body, and a scanner board. The lid is hinged to the main body. The scanner board includes a scanner frame and a glass plate mounted in the scanner frame and extending under the scanner frame. The scanner board further includes an opening on the scanner frame. The opening exposes the glass plate thereunder and the opening is substantially above the start point of the carriage. Therefore, the auto power on scanning apparatus has the advantage of preventing dust from dropping into the interior of the main body. Also, extra care and cost paid to the fragile projected pattern can be eliminated.

20 Claims, 7 Drawing Sheets

SCANNING APPARATUS CAPABLE OF AUTOMATICALLY POWERING ON

BACKGROUND OF THE INVENTION

This application incorporates by reference Taiwanese application Serial No. 89214399, Filed Aug. 18, 2000.

1. Field of the Invention

The invention relates in general to a scanning apparatus which is able to power on automatically, and more particularly to a scanner which has an opening substantially above the start point of the carriage and protected by the glass plate.

2. Description of the Related Art

The integration and application of multi-media are now an overwhelming trend along with the advance and development of the technology. Multi-media include text, voice and image. Within all kinds of apparatus for capturing data, voice or image, image scanning apparatus is now a widely used one.

An auto-power on scanning apparatus is proposed by Mustek Systems Inc. in a R.O.C. patent no. 343029, which is illustrated in FIG. 1. The conventional flatbed scanner as shown in FIG.1 includes a main body 102 and a lid 104. The scanning board 103, which is the upper surface of the main body, supports the document to be scanned. The lid 104 is hinged to the board 103 by a hinge 106 so that the lid 104 can be shut and lifted freely. There is an opening 108 of the board 103 near the hinge 106. A pattern 110 projects from the lid 104 matches the opening 108.

FIG. 2 is the side cross-sectional view of the flatbed scanner as shown in FIG. 1, while the lid 104 is lifted. The scanner is equipped with a carriage 112 inside the main body 102. The carriage 112 includes a light source 114 and a photo sensing module 116, such as a charge-coupled device (CCD) or contact image sensor (CIS). The opening 108 is just above the photo sensing module 116. While the lid 104 is lifted, the light emitted by the light source 114 reaches the lid 104 through the opening 108 but no reflected light from the pattern 100 through the opening 108 can be sensed by the photo sensing module 116. The scanning program is then automatically started.

While the lid 104 is shut, as shown in FIG. 3, the light emitted from the light source 114 is transmitted through the opening 108 and reflected by the pattern 110 on the lid 104. The light reflected from the pattern 110 then is transmitted through the opening 108 and is received by the photo sensing module 116. The scanning program not started in this situation.

However, the auto-power on scanning apparatus has several disadvantages. First, dust may drop into the interior of the main body 102 of the scanner through the opening 108. Second, the projected design of the pattern 110 is rather fragile and could easily be broken. Third, the projected pattern 110 needs a special package to protect itself, which obviously needs extra cost.

SUMMARY OF THE INVENTION

It is therefore an object of the invention to provide a scanning apparatus which is able to automatically power on but without the above-mentioned problems by forming an opening above the glass plate.

The invention achieves the above-identified objects by providing a scanning apparatus capable of automatically powering on. The scanning apparatus comprises a main body, a lid, a carriage inside the main body, and a scanner board. The lid is hinged to the main body. The scanner frame and extended under the scanner frame. The scanner board further includes an opening on the scanner frame. The opening exposes the glass plate thereunder and the opening is substantially above the start point of the carriage.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
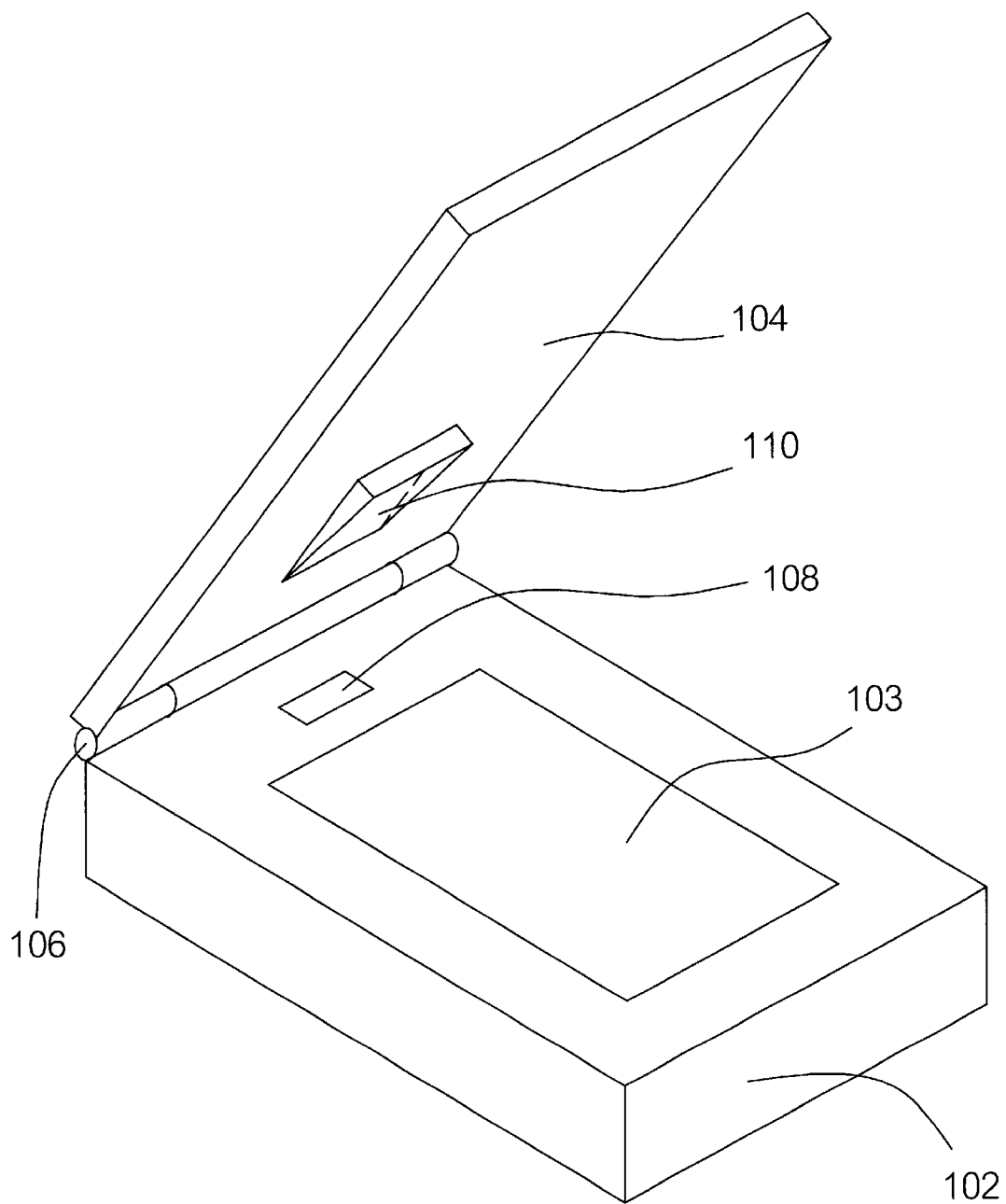
FIG. 1 (Prior Art) shows a conventional auto power on scanning apparatus.
Figure 2:
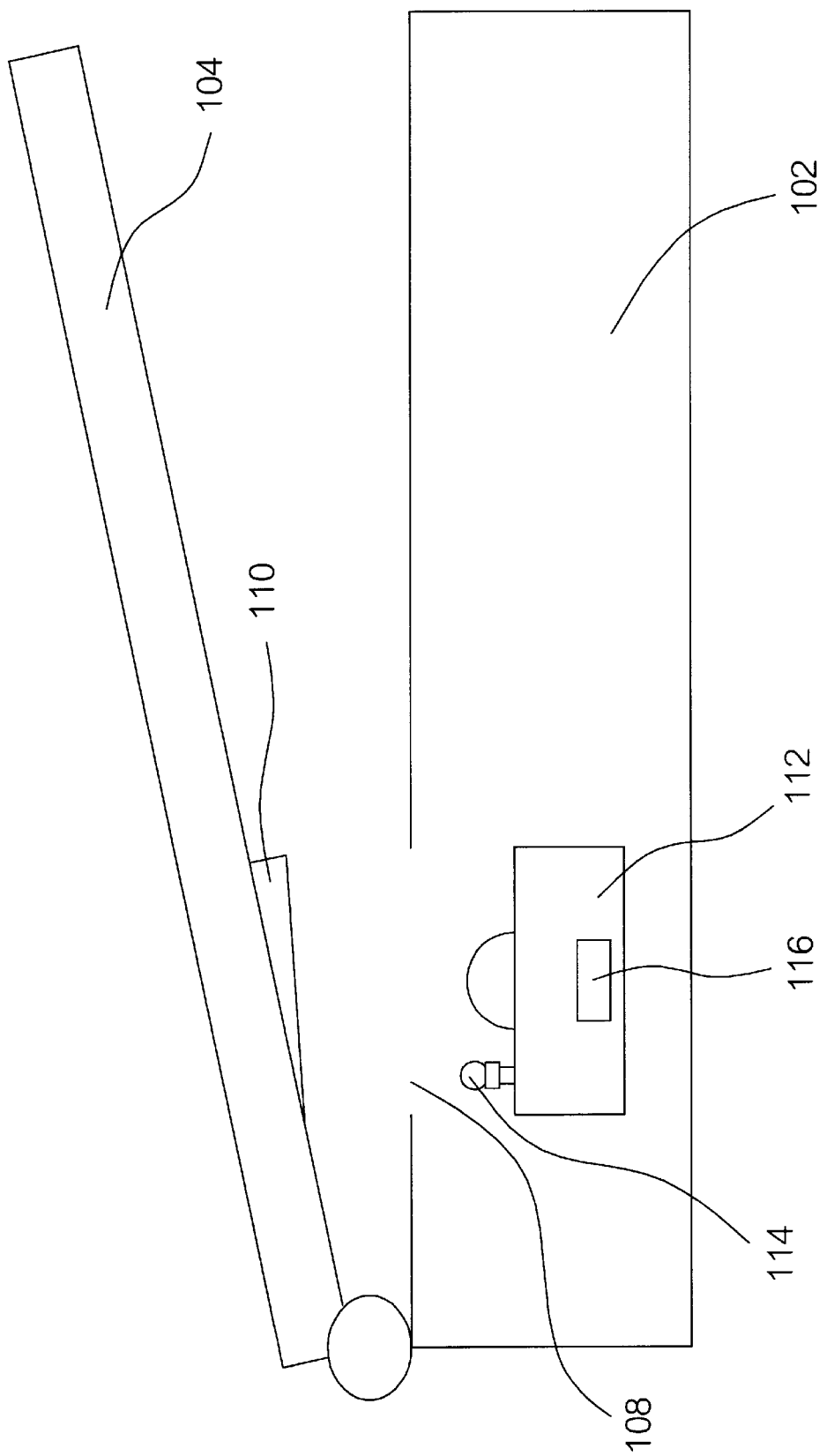
FIG. 2 (Prior Art) is the side cross-sectional view of the flatbed scanner as shown in FIG. 1, while the lid is lifted.
Figure 3:
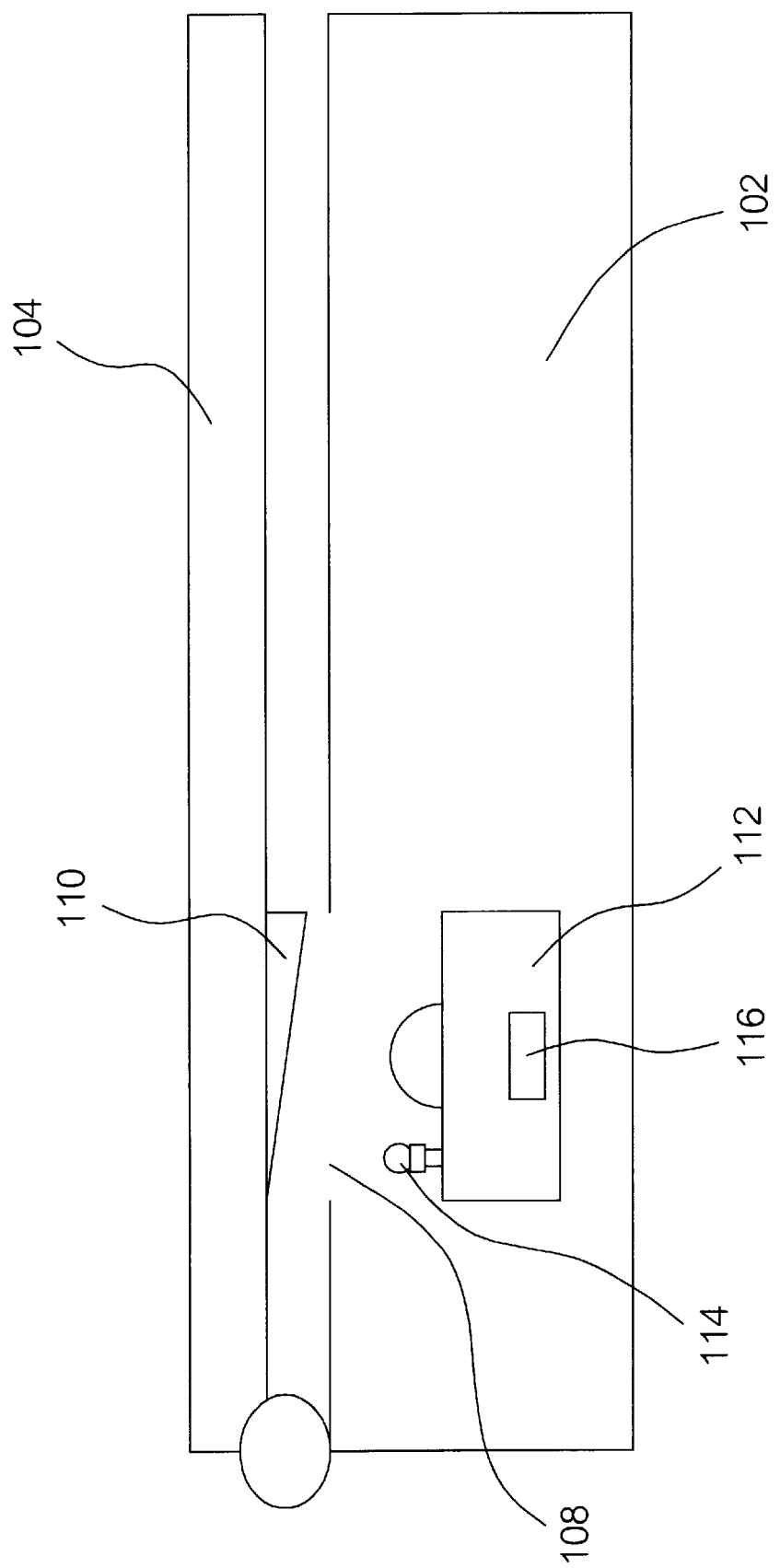
FIG. 3 (Prior Art) is the side cross-sectional view of the flatbed scanner as shown in FIG. 1, while the lid 104 is closed.
Figure 4:
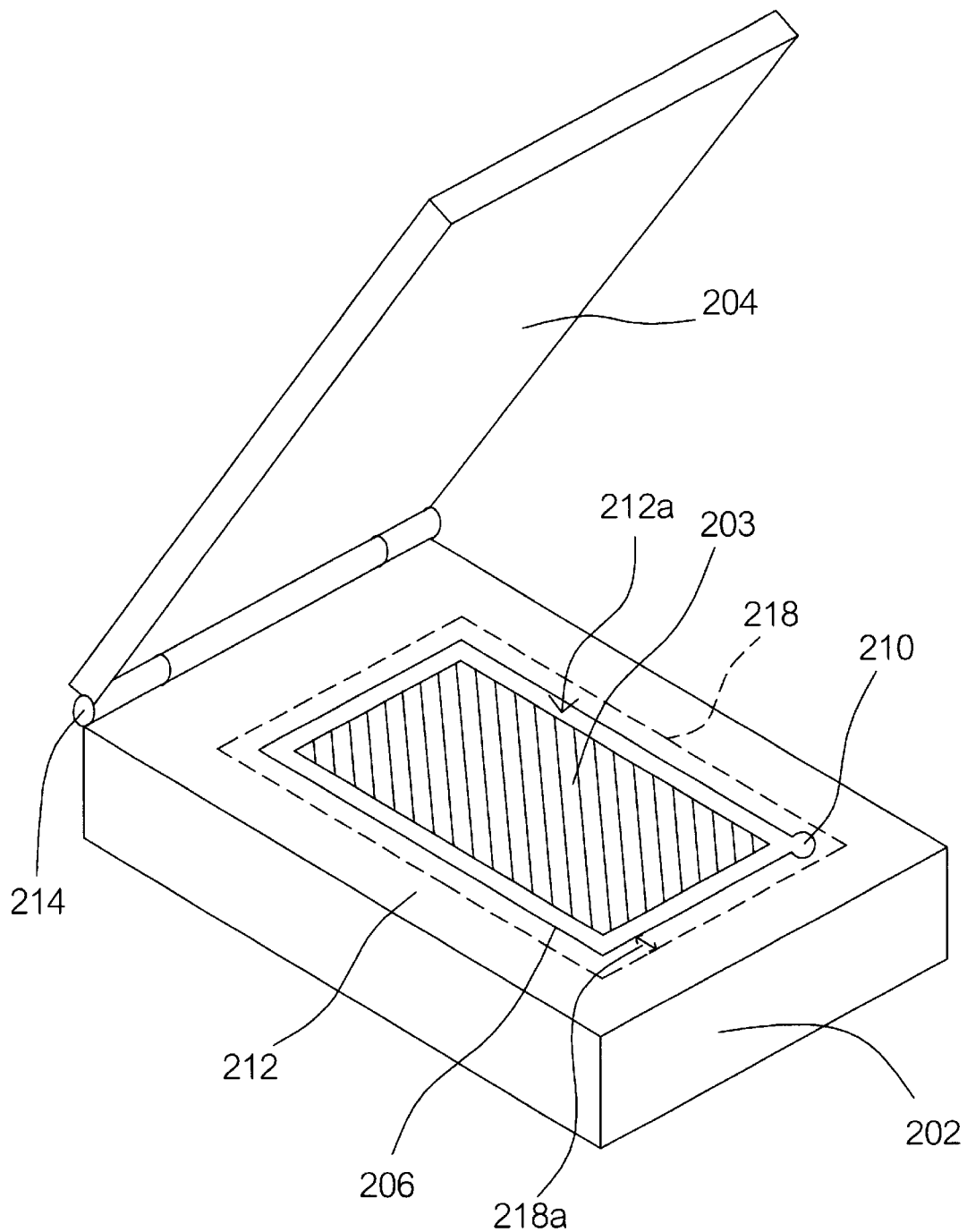
FIG. 4 shows an auto power-on scanning apparatus according to a preferred embodiment of the invention.

A flatbed scanner, as shown in FIG. 4, is taken as an example to illustrate the auto power-on scanning apparatus according to a preferred embodiment of the invention. The flatbed scanning apparatus according to a preferred embodiment of the invention includes a main body 202 and a lid 204. A scanner frame 212 and a glass plate 218 on the upper surface of the main body 202 together form a scanning board, which supports the document to be scanned 203. The scanner frame 212 has a vacancy (opening) 212a in the middle of the scanner 212. The glass plate 218 fills the vacancy 212a by being mounted on the scanner frame 212, and extends under the scanner frame 212 for a certain distance 218a. The lid 204 is hinged to the scanner frame 212 by a hinge 214.

Figure 5:
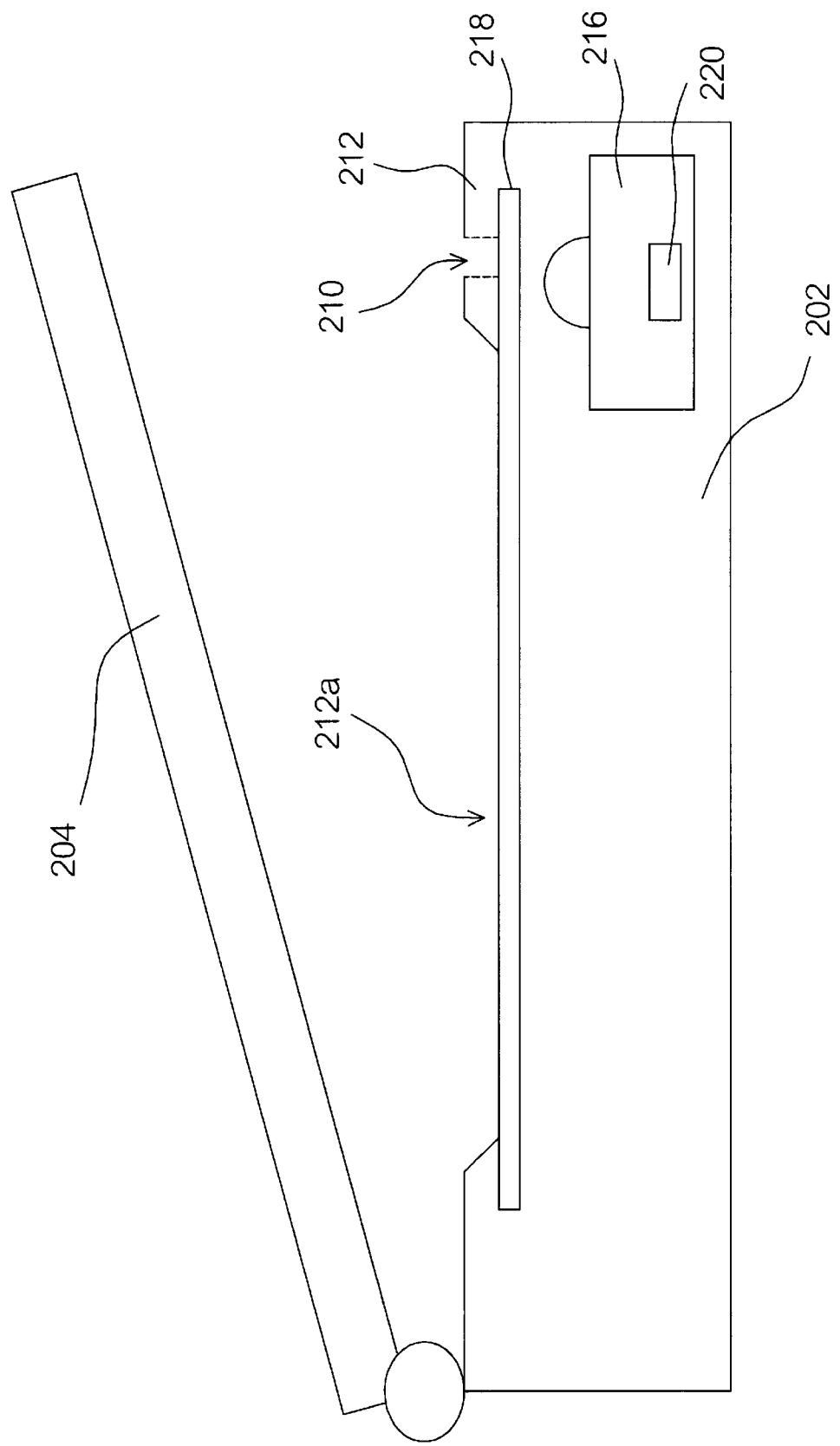
FIG. 5 is the cross sectional view showing an auto power on scanner according to another preferred embodiment of the invention.
Figure 6:
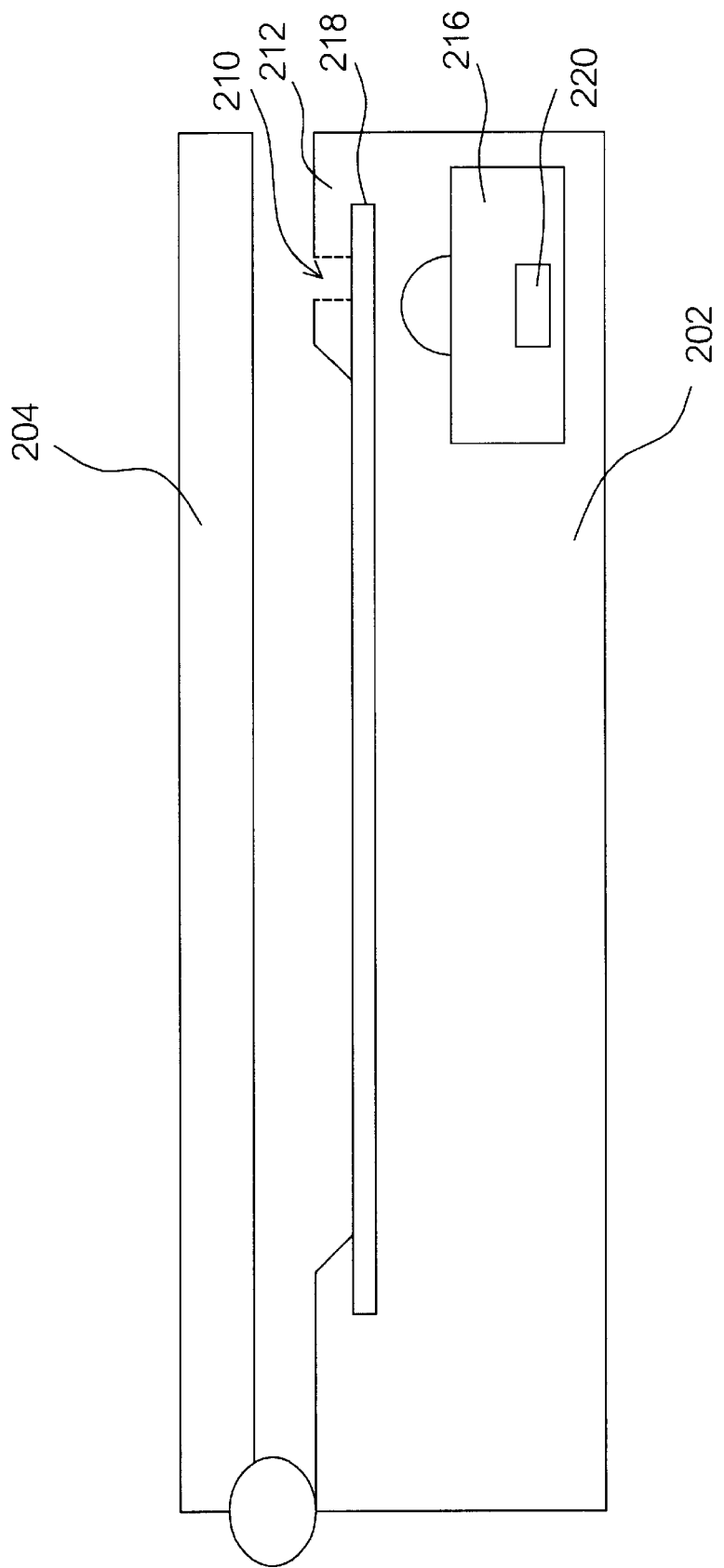
FIG.6 is the cross sectional view showing the auto power on scanner of FIG. 5, while the lid is shut.

According to a preferred embodiment of the invention, an opening 210 of the scanner frame 212 is formed to expose the glass plate 218 underneath. The location of opening 210 is preferably above the carriage 216, as shown in FIG. 5, when the carriage 216 is to at the start point. Moreover, the opening 210 of the scanner frame 212 is limited in the certain distance 218a, to which the glass plate 218 extends so that the interior of the main body 202 is not exposed. Consequently, dust will not drop in and the main body 202.

Referring to FIG. 4, the opening 210 of the scanner frame 212 is configured to be in conjunction with the vacancy 212a. The opening 210 exposes the glass plate 218 and the opening 210 is located at one side of the scanner frame 212. However, the location of the opening 210 is not limited herein. On the contrary, the opening 210 can be separated from the vacancy 212a and the opening 210 can be formed at two sides of the scanner frame 212. FIG. 5 is the cross sectional view showing an auto power on scanner according to another preferred embodiment of the invention, wherein the opening 210 and the vacancy 212a are separated. The main body 202 of the scanner includes a carriage 216 in the interior, and a glass plate 218 and a scanner frame 212 on the upper surface. The carriage 216 is equipped with a photo sensing module 220, which can be, for example, a Charge-Coupled Device (CCD) or a Contact Image Sensor (CIS). The opening 210 exposes the glass plate 218 and is substantially above the carriage 216, when the carriage 216 is at the start point. Thus, while the lid 305 is lifted, light form the environment will transmit through the opening 210 and the certain area of the glass plate 218 therein. The transmitted light will therefore be received and sensed by the photo sensing module 220 equipped in the carriage 216 and then a power on signal will be outputted.

On the other hand, when the lid 204 is shut and covers the opening 210 tightly, no light from the environment will be able to reach the photo sensing module 220. Consequently, the scanner will be kept in a power off condition.

Figure 7:
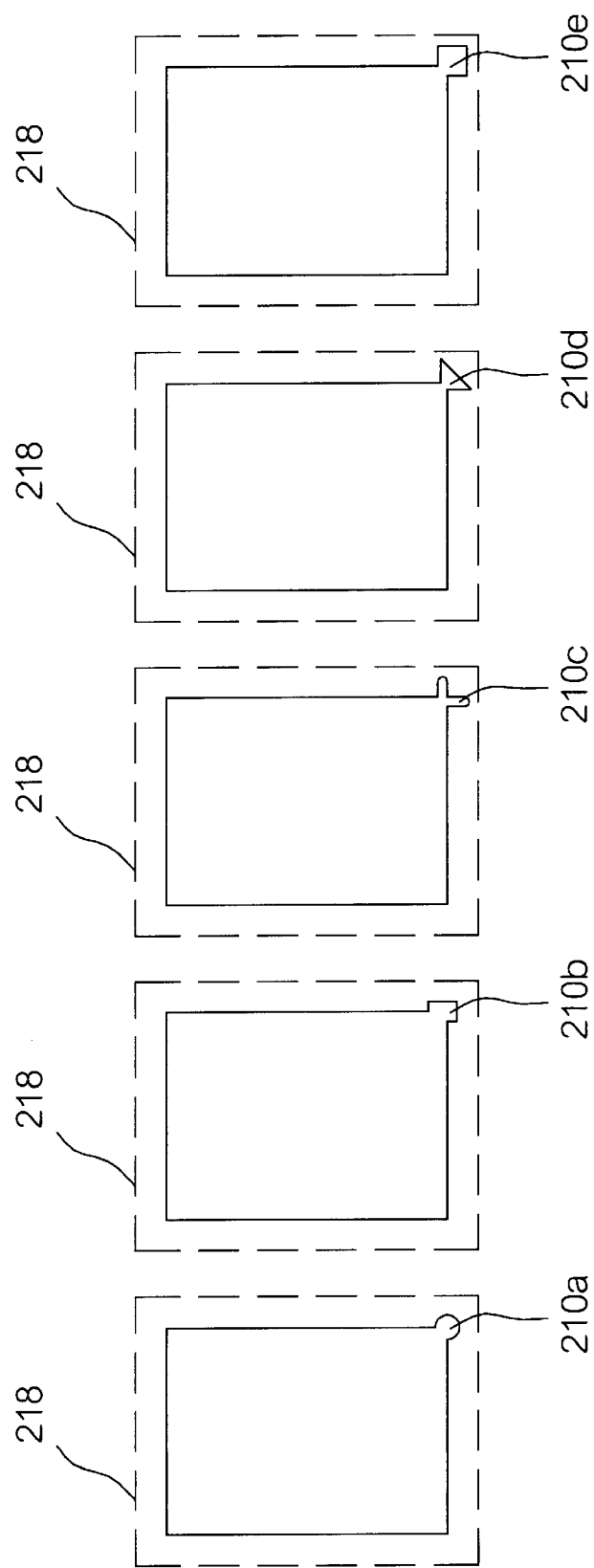
FIG. 7 shows the different configurations of the opening.

According to the spirit of the invention, the configuration of the opening includes a great deal of variety, as shown in FIG. 7. Any modifications of the opening 210 like circular opening 210a, L-shaped opening 210b along an inner corner of the frame vacancy, cross-shaped opening 210c, triangular opening 210d and rectangular opening 210e, are within the scope of the invention. Preferably, the opening 210 is substantially above the start point of the carriage 216 and the opening is within the certain distance 218a to which the glass plate 218 extends so that the light through the opening 210 can be sensed and the opening 210 is sealed and protected by the glass plate 218.

The auto power on scanning apparatus has the following advantages:

1. Dust will not be able to drop in and contaminate the interior of the scanner through the opening since the opening is sealed and protected by the glass plated.

2. Extra care and cost paid to the fragile projected pattern can be eliminated.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus capable of automatically powering on, comprising:
   a main body;
   a lid hinged to the main body;
   a carriage inside the main body, wherein the carriage returns to a start point while the scanning apparatus is not operating; and
   a scanner board, comprising:
      a scanner frame;
      a glass plate mounted in the scanner frame and extended under the scanner frame; and
      an opening in the scanner frame, wherein the opening exposes the glass plate thereunder and the opening is substantially above the start point of the carriage;
   and wherein the opening has one of a circular shape, an L shape, a cross shape, and a triangular shape.

2. A scanning apparatus as claimed in claim 1, wherein the scanner frame further comprises a vacancy and the glass plate is mounted in the scanner frame, fills the vacancy and extends under the scanner frame and wherein the opening is in conjunction with the vacancy.

3. A scanning apparatus as claimed in claim 1, wherein the lid is hinged to the main body by a hinge.

4. A scanning apparatus as claimed in claim 1, wherein the carriage further comprises a photo sensing module to sense light transmitted through the opening.

5. A scanning apparatus as claimed in claim 4, wherein the photo sensing module is a charge-coupled device (CCD).

6. A scanning apparatus as claimed in claim 4, wherein the photo sensing module is a contact image sensor (CIS).

7. A scanning apparatus comprising:
   a main body;
   a lid hinged to the main body;
   a carriage inside the main body, wherein the carriage returns to a start point while the scanning apparatus is not operating; and
   a scanner board, comprising:
      a scanner frame;
      a glass plate mounted in the scanner frame and extended under the scanner frame; and
      an opening in the scanner frame, wherein the opening exposes the glass plate thereunder and the opening is substantially above the start point of the carriage;
   wherein the scanner frame further comprises a vacancy and the glass plate is mounted in the scanner frame, fills the vacancy and extends under the scanner frame and wherein the opening is separated from the vacancy.

8. A scanning apparatus as claimed in claim 7, wherein the opening is a circular opening.

9. A scanning apparatus as claimed in claim 7, wherein the opening is an L-shaped opening along an inner corner of the frame vacancy.

10. A scanning apparatus as claimed in claim 7, wherein the opening is a cross-shaped opening.

11. A scanning apparatus as claimed in claim 7, wherein the opening is a triangular opening.

12. A scanning apparatus as claimed in claim 7, wherein the opening is a rectangular opening.

13. A scanning apparatus, comprising:
   a main body;
   a lid hinged to the main body;
   a carriage movably disposed inside the main body, the carriage returning to a start point when the scanning apparatus is not operating;
   a scanner frame arranged at a top surface of said main body and having first and second openings formed therein, the first opening being configured to allow an object to be scanned therethrough, the second opening being positioned over the start point of said carriage; and
   a glass plate mounted to close the first and second openings in said scanner frame so as to separate an interior of said main body from an exterior of said main body;
   wherein the object to be scanned is placeable on the glass plate and inside of an area defined by the first opening;
   wherein when said lid is lifted, light is transmitted through the second opening and received by said carriage to automatically power on said scanning apparatus; and
   wherein when said lid is closed, light is prevented from being transmitted through the second opening, so that said scanning apparatus is maintained in a power off condition.

14. A scanning apparatus as claimed in claim 13, wherein the glass plate extends under the scanner frame, and wherein the first opening touches and is contiguous with the second opening.

15. A scanning apparatus as claimed in claim 13, wherein the glass plate extends under the scanner frame, and wherein the first opening is separated from the second opening.

16. A scanning apparatus as claimed in claim 13, wherein the second opening has one of a circular shape, an L shape, a cross shape, and a triangular shape.

17. A scanning apparatus as claimed in claim 13, wherein the second opening is a rectangular opening.

18. A scanning apparatus as claimed in claim 13, wherein the carriage further comprises a photo sensing module to sense light transmitted through the second opening.

19. A scanning apparatus as claimed in claim 18, wherein the photo sensing module is a charge-coupled device (CCD).

20. A scanning apparatus as claimed in claim 18, wherein the photo sensing module is a contact image sensor (CIS).

* * * * *